(12) United States Patent
Miyazaki et al.

(10) Patent No.: US 8,077,278 B2
(45) Date of Patent: Dec. 13, 2011

(54) FLEXIBLE DISPLAY DEVICE WITH DILATANT FLUID

(75) Inventors: Takashi Miyazaki, Kawasaki (JP); Hajime Yamaguchi, Kawasaki (JP); Masao Tanaka, Sagamihara (JP); Rei Hasegawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 435 days.

(21) Appl. No.: 12/366,953

(22) Filed: Feb. 6, 2009

(65) Prior Publication Data
US 2009/0244456 A1  Oct. 1, 2009

(30) Foreign Application Priority Data
Mar. 25, 2008  (JP) .................. 2008-078741

(51) Int. Cl.
*G02F 1/13*  (2006.01)
*G02F 1/1333*  (2006.01)

(52) U.S. Cl. .................. 349/122; 349/158; 349/182

(58) Field of Classification Search ............. 349/1, 122, 349/158, 182
See application file for complete search history.

(56) References Cited

U.S. PATENT DOCUMENTS
3,948,325 A * 4/1976 Winston et al. ............. 166/308.5
3,952,577 A * 4/1976 Hayes et al. ................ 73/54.04
H363 H * 11/1987 Duvdevani et al. ............ 44/365

FOREIGN PATENT DOCUMENTS
JP  2003-015795  1/2003
JP  2004-46792   2/2004

* cited by examiner

*Primary Examiner* — Huyen Ngo
(74) *Attorney, Agent, or Firm* — Oblon, Spivak, McClelland, Maier & Neustadt, L.L.P.

(57) ABSTRACT

A display device is provide, which includes a supporting substrate, a flexible display provided with a transparent display substrate formed above the supporting substrate, and a dilatant fluid accommodating member. The dilatant fluid accommodating member is disposed on the outside of the flexible display.

20 Claims, 4 Drawing Sheets

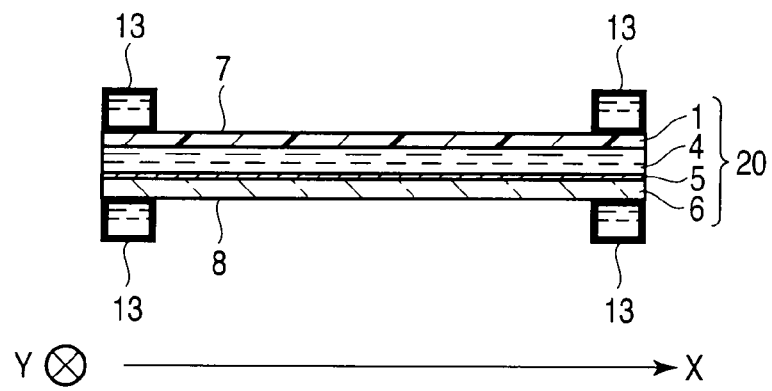
F I G. 7
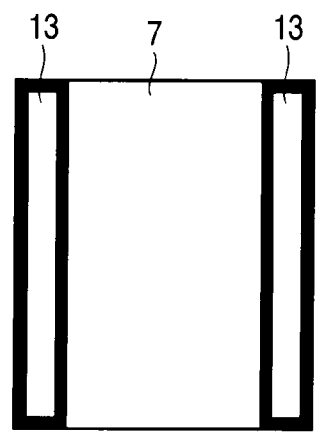
F I G. 8
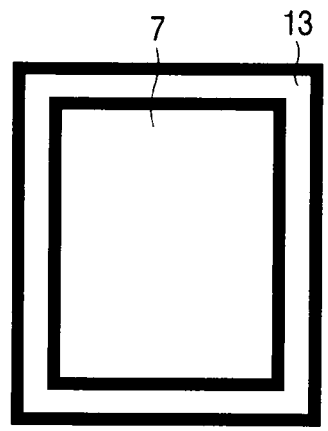
F I G. 9

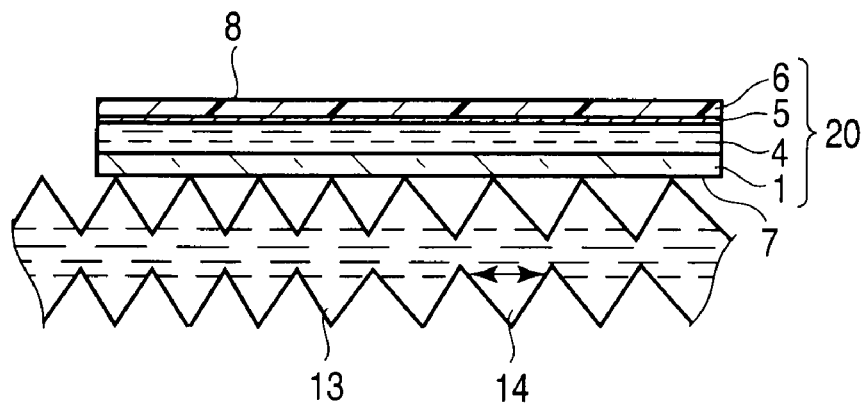
F I G. 10
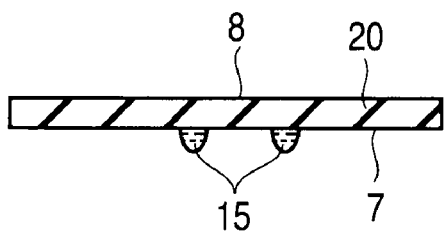
F I G. 11
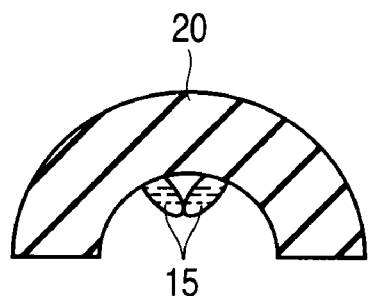
F I G. 12

FLEXIBLE DISPLAY DEVICE WITH DILATANT FLUID

CROSS-REFERENCE TO RELATED APPLICATIONS

This application is based upon and claims the benefit of priority from prior Japanese Patent Application No. 2008-078741, filed Mar. 25, 2008, the entire contents of which are incorporated herein by reference.

BACKGROUND OF THE INVENTION

1. Field of the Invention

This invention relates to a display device.

2. Description of the Related Art

In recent years, since a liquid crystal display device employing a thin film transistor (hereinafter referred to as TFT) is excellent in quality and also in capabilities of displaying animations, it is widely used as a monitor for personal computers or as a display device for information terminals such as a mobile phone, etc.

Recently, in particular, the display device is demanded to exhibit added-values, such as flexibility in addition to the enhanced functions thereof. In recent years, the development of a display device by a plastic substrate is actively studied. For example, in JP-A 2004-046792 (KOKAI), there is described the employment of a plastic substrate in a display device which is achieved in various ways, and also the proposal of a human interface device wherein the input function is designed to be achieved through the flexure of the display.

However, a display device exhibiting such flexibility as described above is accompanied with problems that it is poor in mechanical durability and that it can be easily damaged when it is bent with a strong force. Although it may be possible to prevent such damage by protecting the display device by a plastic sheet of high rigidity, the flexibility of the display device would be sacrificed. As a result, it would be impossible to obtain a display device which is more flexible than that of the plastic sheet employed for the protection.

BRIEF SUMMARY OF THE INVENTION

A display device according to one aspect of the present invention comprises a supporting substrate; a flexible display provided with a transparent display substrate formed above the supporting substrate; and a dilatant fluid accommodating member disposed on the outside of the flexible display.

A display device according to another aspect of the present invention comprises a liquid crystal display comprising a pair of flexible substrates between which a liquid crystal layer is sandwiched; and a dilatant fluid accommodating member disposed to cover an entire outer surface of one of the substrates.

A display device according to another aspect of the present invention comprises a liquid crystal display comprising a pair of flexible substrates between which a liquid crystal layer is sandwiched; and a dilatant fluid accommodating member disposed to partially cover the outer surface of one of the substrates.

BRIEF DESCRIPTION OF THE SEVERAL VIEWS OF THE DRAWING

FIG. 7 is a cross-sectional view of a display device according to a further embodiment;

FIG. 8 is a plan view of the display device shown in FIG. 7;

FIG. 9 is a plan view of a display device according to a further embodiment;

FIG. 10 is a cross-sectional view of a display device according to a further embodiment;

FIG. 11 is a cross-sectional view of a display device according to a further embodiment; and FIG. 12 is a cross-sectional view showing a state of bending deformation of the display device shown in FIG. 11.

DETAILED DESCRIPTION OF THE INVENTION

The present inventors have taken notice of a dilatant fluid which is characterized in that its viscosity is enabled to rise sharply in conformity with the rise in rate of strain. A member accommodating this dilatant fluid is disposed as a protective member on the outside of a flexible display. This protective member is featured in that while it is soft just like a liquid under the condition when no external force is applied thereto, it instantaneously becomes hard just like a solid as an external force is applied thereto due to the rise of viscosity. Owing to these effects, it is now possible to protect the flexible display from bending deformation that may be caused by a strong force. Moreover, the flexibility that the flexible display inherently has would not be damaged at all.

As the dilatant fluid, it is possible to employ a dispersion containing a powdery material such, for example, as corn starch or titanium oxide dispersed in water.

The characteristics of the dilatant fluid can be adjusted by suitably selecting the diameter and volume concentration of the powdery material to be contained therein. For example, in the case of titanium oxide, the particle diameter thereof should preferably be confined within the range of 0.2 to 10 μm and the volume concentration thereof should preferably be confined within the range of 27.2 to 47 vol. %. When these conditions are satisfied, it is possible to enable the dilatant fluid to exhibit the effects thereof.

There is no limitation with regard to the features of water. The aforementioned powdery material may be dispersed in an aqueous solution comprising sodium pyrophosphate and sweet potato sugar which are dissolved in water for stabilizing the dispersion.

The dilatant fluid is sandwiched between a pair of flexible sheets with the peripheral edges thereof being sealed, thereby creating an accommodating member. Alternatively, the dilatant fluid may be accommodated in a tube. The details of the dilatant fluid accommodating member will be explained hereinafter.

In the embodiments, the flexible display may be formed of a display employing a liquid crystal, a display employing an organic LED, or an electronic paper.

Figure 1:
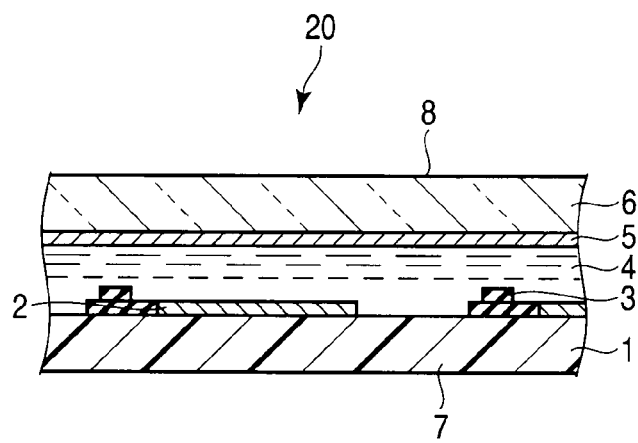
FIG. 1 is a cross-sectional view of a flexible display to be employed in one embodiment.

In the display 20 shown in FIG. 1, a liquid crystal layer 4 is sandwiched between a supporting substrate 1 which is provided with a pixel electrode 2 and with a thin film transistor (TFT) 3, and a counter substrate 6 which is provided with a counter electrode 5. This counter substrate 6 is a display substrate.

In the manufacture of this display, an active matrix substrate is manufactured at first to create a liquid crystal cell. With respect to the manufacturing method of the active matrix, it is possible to employ a transferring method or a direct forming method. Herein however, the direct forming method will be explained wherein a thin film transistor (TFT) is directly formed on a flexible substrate.

With respect to examples of the flexible supporting substrate 1, it is possible to employ, for example, a flexible resin sheet made of polyether sulfone (PES), cycloolefin polymer (COP), polycarbonate (PC), methyl polymethacrylate (PMMA), polyethylene naphthalate (PEN), etc.; and a glass sheet or a metal foil both having a thickness of 150 μm or less. The thickness of the flexible supporting substrate 1 may be confined to 30-200 μm or so, for example 150 μm. After the supporting substrate 1 is subjected to a surface treatment such as a corona discharging treatment or an ozone treatment, an insulating film having a thickness of 50-150 μm or so is deposited on the surface of supporting substrate 1 by sputtering. Examples of the insulating film include a silicon oxide film ($SiO_x$), silicon nitride film ($SiN_x$), silicon oxynitride film ($SiO_xN_y$), etc. Then, a thin film made of a metal such as Mo and Al or made of an alloy such as MoTa and MoW is deposited on the insulating film. Thereafter, by photolithography, this thin film is selectively etched away to obtain the gate electrode of the thin film transistor 3.

Furthermore, by CVD (Chemical Vapor Deposition) method, a gate insulating film, a channel layer and a channel protecting layer are deposited on the supporting substrate 1. With respect to the gate insulating film, it may be formed as a single layer or a laminate layer having a thickness of about 300 nm and constituted by a film of $SiO_x$, $SiN_x$ or $SiO_xN_y$. With respect to the channel layer, it may be constituted by an amorphous silicon layer having a thickness of 150 nm or so. With respect to the channel protecting layer, it may be constituted by a film of $SiO_x$ or $SiN_x$ having a thickness of 300 nm or so.

Then, by photolithography, the channel layer and the channel protecting layer is selectively etched away and by CVD, a phosphorus-doped amorphous silicon is deposited thereon to create an n-type semiconductor layer. It is necessary in these CVD processes to pay attention so as to prevent the supporting substrate 1 from being heated higher than the heat resistance of the supporting substrate 1.

Thereafter, a metallic thin film made of Al, Mo, etc. is deposited to a thickness of about 300 nm. The n-type semiconductor layer and the electrode layer are subjected to a patterning process to form the source electrode and the drain electrode of the thin film transistor by photolithography. With respect to signal lines, they are created from these layers.

Using the CVD method and by $SiO_x$ or $SiN_x$, the protective layer is formed. The pixel electrode 2 can be formed in such a manner that a transparent electrode made of ITO, etc. is deposited by sputtering and the resultant layer is patterned by photolithography.

The aforementioned manufacturing method of the TFT array represents only one example. Further, there is no particular limitation with regard to the semiconductor material such as a-Si, poly-Si and organic semiconductor as well as with regard to the structure of the thin film transistor.

To this thin film transistor thus obtained, an alignment film is formed by a resin such as polyimide which is then subjected to a rubbing treatment. On the other hand, with respect to the counter substrate 6, it is possible to employ a transparent resin sheet made of PES, COP, PC, PMMA, etc., and a glass sheet, each having a thickness of 30-200 μm or so. For example, it is possible to employ a glass substrate having a thickness of 150 μm as the counter substrate 6. A black matrix and a color filter are successively formed on this counter substrate 6, thereby obtaining a counter electrode 5. Thereafter, an alignment film is formed thereon and then subjected to a rubbing treatment.

By a sealing medium having a spacer formed at the peripheral region thereof for securing a gap between the supporting substrate 1 and the counter substrate 6, these substrates 1 and 6 are adhered to each other. Then, a liquid crystal is injected into the gap between these substrates 1 and 6 to form a liquid crystal layer 4 and the periphery of the resultant body is entirely sealed to accomplish the manufacture of the liquid crystal cell.

According to this liquid crystal cell, since not only the supporting substrate 1 but also the counter substrate 6 is excellent in flexibility, this liquid crystal cell can be easily curved.

According to one embodiment, a dilatant fluid accommodating member is disposed on the outside of the flexible display shown in FIG. 1. The thickness of the flexible display may be generally 200-500 μm or so. With respect to the thickness of the dilatant fluid accommodating member, it can be optionally determined as long as it does not affect the aforementioned flexibility of the display.

Figure 2:
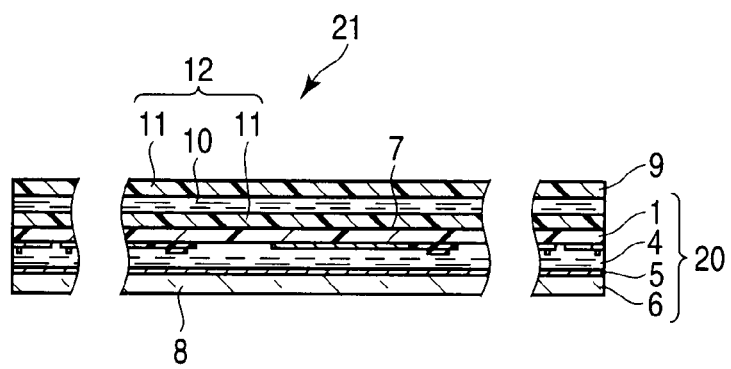
FIG. 2 is a cross-sectional view of a display device according to one embodiment.

The dilatant fluid accommodating member can be disposed, for example, all over the surface of the supporting substrate of a flexible display. FIG. 2 shows a cross-sectional view of the display device constructed in this manner. In the display device 21 shown herein, a dilatant fluid accommodating member 12 is disposed all over the surface of supporting substrate 1 of a flexible display 20. In this case, it will be admitted that the dilatant fluid accommodating member 12 is disposed to entirely cover the rear surface of the flexible display 20. This dilatant fluid accommodating member 12 is constructed such that a dilatant fluid 10 is sandwiched between a pair of flexible sheets 11 each having a sealing portion 9 on the periphery thereof. With respect to the flexible sheets 11, it is possible to employ a sheet having a thickness of 20-40 μm or so and made of polypropylene, polyethylene, polyamide, polyvinylidene chloride, etc. By an adhesive, etc., the peripheral portions of these flexible sheets are sealed to create a sealing portion 9.

Figure 3:
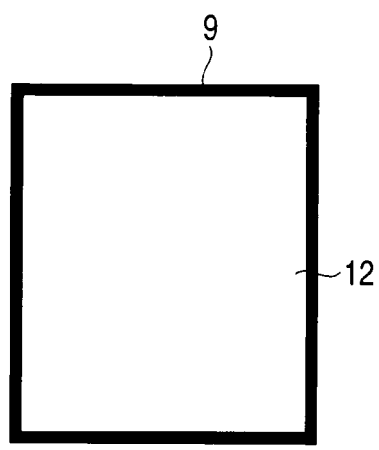
FIG. 3 is a plan view of the display device shown in FIG. 2.
Figure 4:
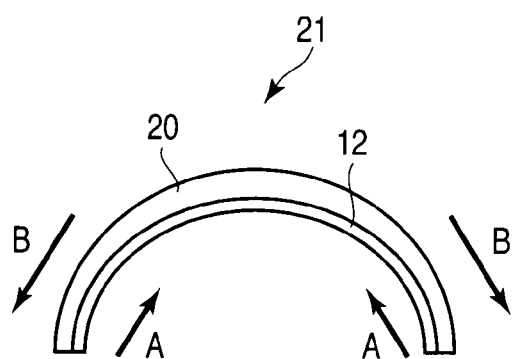
FIG. 4 is a cross-sectional view showing a state of bending deformation of the display device shown in FIG. 2.

FIG. 3 is a plan view showing the rear surface 7 of the display device shown in FIG. 2. When a bending deformation is applied to this display device 21, forces shown in FIG. 4 act on this display device 21. In FIG. 4, the arrow "A" indicates a shrinking direction and the arrow "B" is an elongating direction. In a case where the dilatant fluid accommodating member 12 is disposed on the rear surface 7 of the flexible display 20, the dilatant fluid is distorted in the shrinking direction "A". When this bending deformation is imposed on the dilatant fluid by the application of a strong force thereon in this direction, the dilatant fluid is caused to harden, thereby preventing the flexible display 20 from being damaged.

The dilatant fluid accommodating member 12 is not necessarily disposed to entirely cover the rear surface 7 of the flexible display 20. Namely, the dilatant fluid accommodating member 12 may be disposed to cover only a portion of the rear surface 7 of the flexible display 20.

Figure 5:
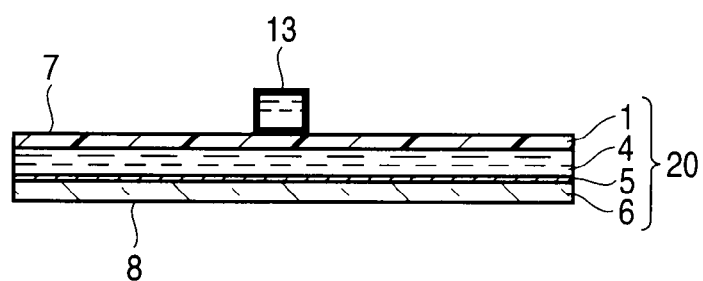
FIG. 5 is a cross-sectional view of a display device according to another embodiment.

The dilatant fluid may be accommodated in an elongated hollow body such as a tube in constructing the dilatant fluid accommodating member. A dilatant fluid accommodating member 13 constructed in this manner may be disposed to cover only a portion of the rear surface 7 of the flexible display 20 as shown by the cross-sectional view of FIG. 5.

Figure 6:
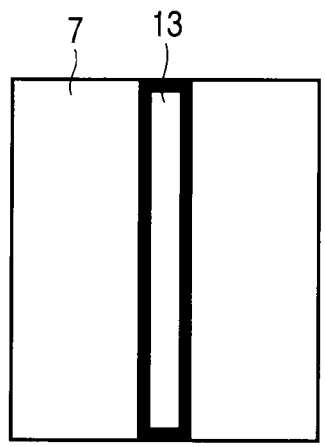
FIG. 6 is a plan view of the display device shown in FIG. 5.

With respect to the location of the dilatant fluid accommodating member 13 to be disposed, there is no particular limitation as long as the dilatant fluid accommodating member 13 is disposed on the rear surface 7 of the flexible display 20. For example, as shown in FIG. 6, the dilatant fluid accommodating member 13 may be disposed longitudinally along a central line of the rear surface 7 of the flexible display 20. Although not shown herein, a plurality of dilatant fluid accommodating members 13 may be disposed in a desired arrangement. Alternatively, the dilatant fluid accommodating member may be bent or curved to create any desired configuration, thus enabling it to be disposed at a predetermined region of the rear surface 7 of the flexible display 20.

This dilatant fluid accommodating member 13 may be disposed on not only the rear surface 7 but also the front surface 8 of the flexible display 20. More specifically, as shown in the cross-sectional view of FIG. 7, two dilatant fluid accommodating members 13 may be disposed so as to face the rear surface 7 as well as the front surface 8 of the flexible display 20, respectively, thereby sandwiching the flexible display 20. FIG. 8 shows a plan view of the rear surface 7 of the flexible display 20. In the same manner as shown in FIG. 8, the dilatant fluid accommodating member 13 is disposed on the front surface 8.

Since the dilatant fluid accommodating member 13 is disposed so as to sandwich the flexible display 20 by the opposite sides thereof extending in the Y-axis direction, the effects of the dilatant fluid accommodating member 13 can be exhibited against the bending in the direction of this Y-axis direction. Namely, as far as the bending in the direction of this Y-axis direction is concerned, the flexible display 20 can be protected against the bending in the upward direction as well as against the bending in the downward direction.

Alternatively, as shown in FIG. 9, the dilatant fluid accommodating member 13 may be disposed along the outer periphery of the rear surface 7 of the flexible display 20. The arrangement of the dilatant fluid accommodating member 13 along the outer periphery of the flexible display 20 is not limited to the rear surface 7 of the flexible display 20 but may be performed likewise to the front surface 8. In this case, the dilatant fluid accommodating member 13 is disposed along two directions, i.e. the X-axis direction and the Y-axis direction. Therefore, the flexible display 20 can be protected against the bending in not only the X-axis direction but also the Y-axis direction.

With respect to the configuration of the tube for accommodating the dilatant fluid, it may be bellows-like. More specifically, as shown in the side view of FIG. 10, the tube 13 is enabled to expand and contract as the flexible display 20 is caused to bend. When a shock is applied to the tube, the tube becomes hard due to the effects of the dilatant fluid. Particularly, when the tube is bellows-like, a sufficient magnitude of expansion and contraction can be realized as the tube is bent at the antinode portion 14 thereof, thus facilitating the development of the dilatant phenomenon.

The dilatant fluid accommodating member may be formed into a pad-like configuration. More specifically, by the term "pad-like configuration", it is intended to indicate a hemispherical dome-like configuration. FIG. 11 shows a side view of the display device having a pad-like dilatant fluid accommodating member 15 disposed on the rear surface 7 of the flexible display 20. When a strong force is applied to the flexible display 20 to bend the flexible display 20 at a radius of curvature which is larger than a threshold value, the aforementioned pads existing on the inner surface of the flexible display 20 are caused to contact each other. As a result, strain generates in the direction to push each of the pads 15 inward, resulting in the hardening of the pads.

The threshold value of the aforementioned radius of curvature can be adjusted by suitably selecting the distance between the pads and the height of the pads. The size of the pad-like dilatant fluid accommodating member 15 may be optionally determined in conformity with the quantity and concentration of the dispersion containing a powdery material, with the size of display and with the acceptable weight of the display device. This pad-like dilatant fluid accommodating member 15 can be disposed at optional locations on the rear surface 7 of the flexible display 20 by taking into consideration the location where the bending deformation is applied.

According to the embodiment of the present invention, it is possible to provide a display device which is excellent in mechanical durability against the bending deformation to be acted thereon by a strong force.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display device comprising:
   a supporting substrate;
   a flexible display provided with a transparent display substrate formed above the supporting substrate; and
   a dilatant fluid accommodating member disposed on the outside of the flexible display.

2. The device according to claim 1, wherein the dilatant fluid accommodating member is formed of flexible sheets between which a dilatant fluid is accommodated.

3. The device according to claim 1, wherein the dilatant fluid accommodating member is disposed to entirely cover the supporting substrate of the flexible display.

4. The device according to claim 1, wherein the dilatant fluid accommodating member is formed of a tube accommodating the dilatant fluid.

5. The device according to claim 4, wherein the dilatant fluid accommodating member is disposed to partially cover the supporting substrate of the flexible display.

6. The device according to claim 4, wherein the tube is bellows-like.

7. The device according to claim 1, wherein the dilatant fluid accommodating member is disposed at an outer peripheral portion of the supporting substrate and/or the display substrate of the flexible display.

8. The device according to claim 1, wherein the supporting substrate of the flexible display is formed of a glass substrate, a flexible resin sheet or a metal foil, each having a thickness of 150 μm or less.

9. The device according to claim 8, wherein the display substrate of the flexible display is formed of a glass substrate, a flexible resin sheet or a metal foil, each having a thickness of 150 μm or less.

10. The device according to claim 1, wherein the flexible display is a liquid crystal display, an organic EL display, or an electronic paper.

11. The device according to claim 1, wherein a dilatant fluid comprises a powdery material selected from corn starch and titanium oxide; and water.

12. A display device comprising:
    a liquid crystal display comprising a pair of flexible substrates between which a liquid crystal layer is sandwiched; and
    a dilatant fluid accommodating member disposed to cover an entire outer surface of one of the substrates.

13. The device according to claim 12, wherein the dilatant fluid accommodating member is formed of flexible sheets between which a dilatant fluid is accommodated.

14. The device according to claim 13, wherein the flexible sheets have respectively a thickness of 20-40 μm.

15. The device according to claim 14, wherein the flexible sheets are formed of a plastic material selected from the group consisting of polypropylene, polyethylene, polyamide, polyvinylidene chloride.

16. A display device comprising:

a liquid crystal display comprising a pair of flexible substrates between which a liquid crystal layer is sandwiched; and a dilatant fluid accommodating member disposed to partially cover the outer surface of one of the substrates.

17. The device according to claim 16, wherein the dilatant fluid accommodating member is formed of a tube accommodating a dilatant fluid.

18. The device according to claim 16, wherein the dilatant fluid accommodating member is disposed longitudinally along a central line of at least one substrate.

19. The device according to claim 16, wherein the dilatant fluid accommodating member is disposed at opposite sides of at least one substrate.

20. The device according to claim 16, wherein the dilatant fluid accommodating member is bellows-like.

* * * * *